May 9, 1933. W. M. PERRY 1,907,864
FLAW DETECTOR FOR CABLES
Filed Dec. 13, 1930

INVENTOR
Walter M. Perry
BY
Joseph H. Lipschutz
ATTORNEY

Patented May 9, 1933

1,907,864

UNITED STATES PATENT OFFICE

WALTER M. PERRY, OF BROOKLYN, NEW YORK, ASSIGNOR TO SPERRY PRODUCTS, INC., A CORPORATION OF NEW YORK

FLAW DETECTOR FOR CABLES

Application filed December 13, 1930. Serial No. 502,159.

This invention relates to a device for detecting flaws or broken strands in cables, such as elevator cables. It is of particular value in the testing of elevator cables while in service.

The method now used to detect broken strands in elevator cables consists in holding a wad of cotton-waste tightly wrapped around the cable to be tested so that broken strands that have reached the surface of the cable become entangled in the waste and thus give an indication to the inspector. It will be obvious that this method is crude and inaccurate and will fail to detect broken strands not on the surface or the presence of internal flaws within any single strand.

It is the principal object of my invention, therefore, to provide a detecting device that will accurately detect all broken strands both on the surface and inside the cable, as well as any other flaws within any strand. For this purpose I employ the principle of flaw detection utilized in the co-pending application of Elmer A. Sperry, Serial No. 298,771, filed August 10, 1928, in which a current of large amperage is passed through a portion of the conductor to be tested (in this case the elevator cable) and a set of opposed induction coils is moved relative to the electro-magnetic field thus created so that flaws which cause a displacement of the current axis and, hence, of the electromagnetic field, will induce a differential E. M. F. which, after being amplified, may be caused to actuate a suitable indicator for indicating the presence of a flaw or broken strand.

In the testing of elevator cables while in service by the method set forth above, certain problems present themselves which it is the object of my invention to solve. Thus, a suitable means for making contact with the moving cable must be provided, as well as a support for the detector unit. The testing device should be anchored against movement with the cable and should be insulated from its supporting element. In the interest of accuracy, the detector coil should be maintained in predetermined relationship to the cable not only radially of said cable, but also axially thereof, so that the detector coils may co-act with a definite pitch of the cable strands. Since there are always several cables close together in actual service, the testing device for any cable should be insulated from adjacent cables.

It is a further object of my invention to provide a testing device of the type described which can be readily attached to and detached from the cable.

Further objects and advantages of my invention will become apparent from the following detailed description thereof.

In the accompanying drawing.

Figure 1:
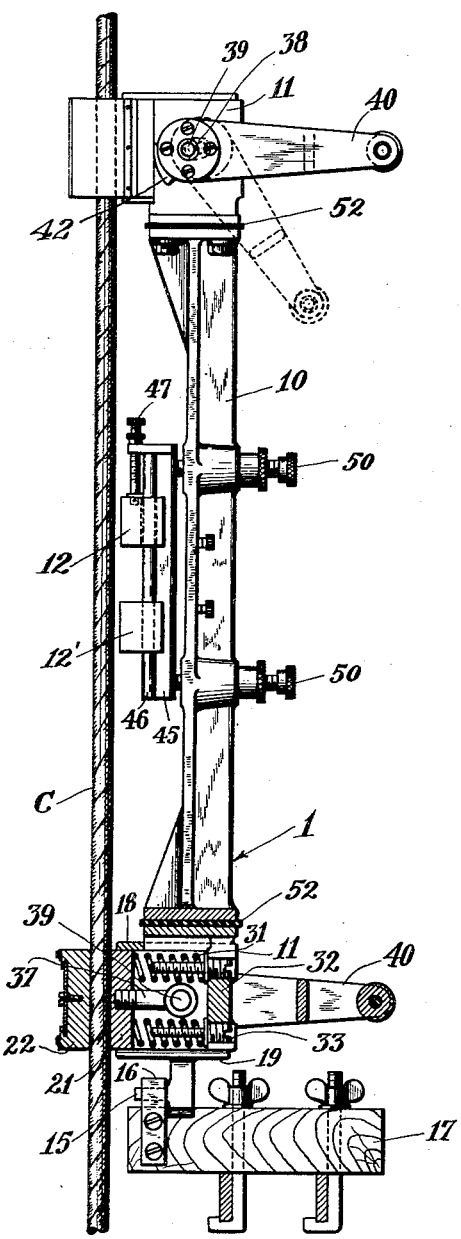
Fig. 1 is a side elevation of one portion of my invention, partly sectioned vertically, showing my device applied to a cable.
Figure 2:
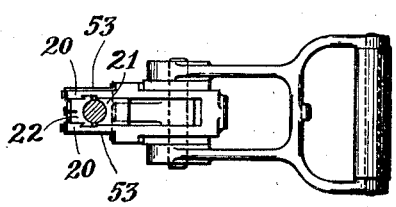
Fig. 2 is an end elevation of Fig. 1.

Referring to the drawing, the cable testing device is indicated generally by the numeral 1 and may comprise essentially a pair of spaced contact members 11 for leading current into and out of a portion of the cable C, and a pair of opposed induction coils 12, 12', maintained by apparatus to be described hereinafter in predetermined relation to the electro-magnetic field surrounding the cable so that when a flaw in the cable is encountered, a differential E. M. F. will be generated which can be utilized for operating a suitable indicator as in the said Sperry application, Serial No. 298,771. The contact members 11 and the coils 12 and 12' are supported by a support 10, which may be held against movement with the cable by means of a hook 15 engaging within an eye 16 fixed to the fixed plate 17.

Figure 3:
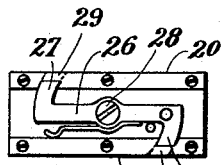
Fig. 3 is an enlarged detail showing the lock for the movable contact block.

For attaching the testing device, including the said support 10, contact members 11 and coils 12, 12', to the cable, the hook 15 is inserted within the eye 16 and the device is then attached to the cable by means of the upper and lower contact members 11, which are similar, so that only one of these need be described. In Fig. 1 the lower contact member is shown in section and it will be apparent that there are provided within upper and lower guide members 18 and 19 and within side guide members 20 elements 21 and 22, forming co-acting contact block portions. The element 22 is held within the guide members 20 by means of a removable locking lever 26 (see Fig. 3), pivoted at 28 on the edge of element 22, and provided with oppositely extending prongs 27 which may be swung into openings 29 in the sides of guide members 20 to lock the contact block portion 22 in place.

The other contact block 21 is slidably mounted between the upper and lower guides 18, 19 and side guides 20, and is normally pressed towards engagement with contact block portion 22 by means of coil springs 31 pressing at one end against block portion 22 and at the other end against the fixed end wall 32 of the support. The tension of the springs may be adjusted by means of adjusting screws 33 to provide sufficient tension to cause contact block portions 21 and 22 to grip the cable with sufficient pressure to afford good electrical contact while permitting the cable to operate therethrough. For unlocking the contact blocks from the cable there may be provided the handle 40 pivoted on a shaft 39 extending through the member 11 and provided with cam portions 42 at its ends, which engage the fixed side walls 20 so that as said handle is moved from the full line position to the dotted line position, the shaft 39 is moved toward the right (in Fig. 1) within guide slots 38 and carries with it, against the action of springs 31, block 21 by means of an arm 37 threaded into said block.

When it is desired to release the device from the cable it is only necessary to swing locking lever 26 on its pivot 28 to disengage prongs 27 from opening 29 and thus permit the end block portion 22 to be withdrawn, whereupon the hook 15 carried by support 10 may be withdrawn from eye 16 so that the entire mechanism is readily disengaged from the cable.

In order to effect accurate testing, it is desirable that the coils 12, 12' be maintained in predetermined relation with respect to the cable not only radially thereof, but also axially thereof. In order that the coils may be spaced axially a predetermined distance so that they may always co-act with a given pitch of the cable, the said coils may be mounted upon a holder 45. One of the coils, such as 12', may be fixed upon said holder while the other coil 12 may be in slidable engagement with a flange 46 of said holder and may be operated axially of the cable, that is, towards and away from coil 12' by means of a screw 47 passing through the end of the holder 45 and engaging in said coil 12.

In order that the holder may bear a predetermined relation with respect to the cable radially thereof, said holder may be mounted on the support 10 by means of screws 50 passing through the support 10 and engaging in the holder 45.

The support 10 may be insulated from the contact blocks by means of insulation 52 between the support 10 and the contact members 11. It is also desirable to insulate the current-conducting contact blocks from adjacent cables. For this purpose there may be fixed to the outside of side walls 20, sheets of insulation 53.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for testing cables and the like, contact means for leading current into and out of the cable, a detector unit having a plurality of coils, means for supporting said contact means and said detector unit, and means whereby the distance between the detector coils may be predetermined in accordance with the pitch of the cable.

2. In a device for testing cables and the like, contact means for leading current into and out of the cable, a detector unit having a plurality of coils, means for supporting said contact means and said detector unit, and means whereby the detector coils may be moved relative to each other axially of the cable.

3. In a device for testing cables and the like, contact means for leading current into and out of the cable, a detector unit having a plurality of coils, means for supporting said contact means and said detector unit, means whereby the distance between the detector coils may be predetermined axially of the cable, and means whereby said detector unit may be maintained at a predetermined distance radially with respect to said cable.

4. In a device for testing cable and the like, contact means for leading current into and out of the cable, a detector unit having a plurality of coils, means for supporting said contact means and said detector unit, means whereby the distance between the detector coils may be predetermined in accordance with the pitch of the cable, and means whereby said supporting means may be detachably secured to said cable.

5. In a device for testing cables and the like, contact means for leading current into and out of the cable, a detector unit having a plurality of coils, means for supporting said contact means and said detector unit, means whereby the distance between the detector coils may be predetermined axially of the cable, means whereby said detector unit may be maintained at a predetermined distance radially with respect to said cable, and means whereby said supporting means may be detachably secured to said cable.

6. In a device for testing elevator cables in service by means of a detector unit responsive to variations in current flow through the cable, contact means for leading current into and out of said cable, means for maintaining said contact means in frictional engagement with the moving cable, and means whereby said contact means may be released from said cable.

7. In a device for testing elevator cables in service by means of a detector unit responsive to variations in current flow through the cable, contact means for leading current into and out of said cable, means for maintaining said contact means in frictional engagement with the moving cable, each of said last named means comprising a plurality of relatively movable members adapted to engage said cable.

8. In a device for testing elevator cables in service by means of a detector unit responsive to variations in current flow through the cable, contact means for leading current into and out of said cable, means for maintaining said contact means in frictional engagement with the moving cable, each of said last named means comprising a plurality of relatively movable members adapted to engage said cable, and means whereby said members may be moved relative to each other.

9. In a device for testing elevator cables in service by means of a detector unit responsive to variations in current flow through the cable, contact means for leading current into and out of said cable, means for maintaining said contact means in frictional engagement with the moving cable, each of said last named means comprising a plurality of relatively movable members adapted to engage said cable, means whereby said members may be moved relative to each other, and means whereby one of said members may be detached to permit detachment of said device from said cable.

10. In a device for testing elevator cables in service by means of a detector unit responsive to variations in current flow through the cable, contact means for leading current into and out of said cable, means for maintaining said contact means in frictional engagement with the moving cable, each of said last named members comprising a plurality of relatively movable members adapted to engage said cable, means whereby said members may be moved relative to each other, and a detachable lock for one of said members to permit detachment of the device from said cable.

11. In a device for testing elevator cables in service by means of a detector unit responsive to variations in current flow through the cable, contact means for leading current into and out of said cable, means for maintaining said contact means in frictional engagement with the moving cable, and means whereby said device is held against movement with said cable.

12. In a device for testing elevator cables in service by means of a detector unit responsive to variations in current flow through the cable, contact means for leading current into and out of said cable, and means whereby said contact means is insulated from adjacent cables.

13. In a device for testing elevator cables in service by means of a detector unit responsive to variations in current flow through the cable, contact means for leading current into and out of said cable, means for maintaining said contact means in frictional engagement with the moving cable, each of said last-named means comprising a plurality of relatively movable members adapted to engage said cable, resilient means for moving said members relatively into engagement with said cable, and means whereby said members may be moved relative to each other against the action of said spring to disengage said cable.

In testimony whereof I affix my signature.

WALTER M. PERRY.